US012746562B2

(12) United States Patent
Kato

(10) Patent No.: US 12,746,562 B2
(45) Date of Patent: Sep. 29, 2026

(54) LIQUID JET DEVICE

(71) Applicant: SEIKO EPSON CORPORATION, Tokyo (JP)

(72) Inventor: Masaki Kato, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 99 days.

(21) Appl. No.: 18/884,330

(22) Filed: Sep. 13, 2024

(65) Prior Publication Data

US 2025/0091080 A1 Mar. 20, 2025

(30) Foreign Application Priority Data

Sep. 15, 2023 (JP) ................................ 2023-149896

(51) Int. Cl.

| | |
|---|---|
| ***B05B 15/00*** | (2018.01) |
| ***B05B 1/28*** | (2006.01) |
| ***B05B 11/02*** | (2023.01) |
| ***B05B 13/00*** | (2006.01) |

(52) U.S. Cl.

CPC ................ *B05B 15/00* (2013.01); *B05B 1/28* (2013.01); *B05B 11/02* (2013.01); *B05B 13/00* (2013.01)

(58) Field of Classification Search

CPC .. B05B 1/00; B05B 1/28; B05B 11/02; B05B 13/00; B05B 15/00; A61B 2217/005; A47L 9/00

USPC ................ 239/104, 119, 120, 320–324, 589; 134/21; 15/300.1; 604/313

See application file for complete search history.

(56) References Cited

U.S. PATENT DOCUMENTS

| | | | | |
|---|---|---|---|---|
| 4,563,840 A * | 1/1986 | Urakami | B24C 3/065 | 239/120 |
| 5,830,334 A * | 11/1998 | Kobayashi | C25D 5/08 | 239/104 |
| 6,244,519 B1 * | 6/2001 | Hayakawa | B23K 9/325 | 239/120 |
| 6,554,205 B1 * | 4/2003 | Shinozuka | H10P 72/0421 | 239/120 |
| 2017/0014149 A1 | 1/2017 | Nakayashiki et al. | | |

FOREIGN PATENT DOCUMENTS

WO 2015136883 A1 9/2015

* cited by examiner

*Primary Examiner* — Steven J Ganey

(74) *Attorney, Agent, or Firm* — CHIP LAW GROUP

(57) ABSTRACT

The liquid jet device 1 includes a nozzle 3 that ejects liquid L from a nozzle aperture 3*a* in a jet direction B along a first axis AX, a liquid transport tube 7 that transports the liquid L to the nozzle 3, and a suction tube 10 that has a suction port 12*a* and sucks the liquid L jetted from the nozzle 3 through a suction port 12*a*. The suction tube 10 has an extended portion 11 that extends along the first axis AX and a bent portion 12 that connects to the extended portion 11 and bends in a bending direction that intersects the first axis AX, the suction port 12*a* is disposed on an opposite side of the bent portion 12 from the side of the bent portion 12 connecting to the extended portion 11, and the suction port 12*a* is located, in the direction along the first axis AX, on a side of the jet direction B from the nozzle aperture 3*a*.

7 Claims, 8 Drawing Sheets

LIQUID JET DEVICE

The present application is based on, and claims priority from JP Application Serial Number 2023-149896, filed Sep. 15, 2023, the disclosure of which is hereby incorporated by reference herein in its entirety.

BACKGROUND

1. Technical Field

The present disclosure relates to a liquid jet device.

2. Related Art

A variety of liquid jet devices have been used in the past. Amongst these devices, there is a liquid jet device that can suck liquid jetted from a nozzle through a suction port. For example, WO2015/136883 discloses a liquid jet device in which a suction tube that sucks liquid, which was jetted on an object, from on the object is provided concentrically around the nozzle.

However, in a liquid jet device of the related art, such as the liquid jet device described in WO2015/136883, which can suck liquid that was jetted from a nozzle through a suction port, the suction port may stick to the object when the liquid is sucked while the liquid is being jetted. If the suction port sticks to the object, the suction efficiency of liquid decreases, and impact force of liquid jetted from the nozzle with respect to the object decreases.

SUMMARY

A liquid jet device according to the present disclosure for solving the above problems includes a nozzle configured to jet liquid from a nozzle aperture in a jet direction along a first axis; a liquid transport tube that transports the liquid to the nozzle; and a suction tube that has a suction port and that sucks the liquid jetted from the nozzle through the suction port, wherein the suction tube has an extended portion that extends along the first axis and a bent portion that is connected to the extended portion and that bends in a bending direction that intersects the first axis, the suction port is disposed on an opposite side of the bent portion from the side of the bent portion connected to the extended portion, and the suction port is located further to the jet direction side than is the nozzle aperture in a direction along the first axis.

DESCRIPTION OF EMBODIMENTS

Figure 1:
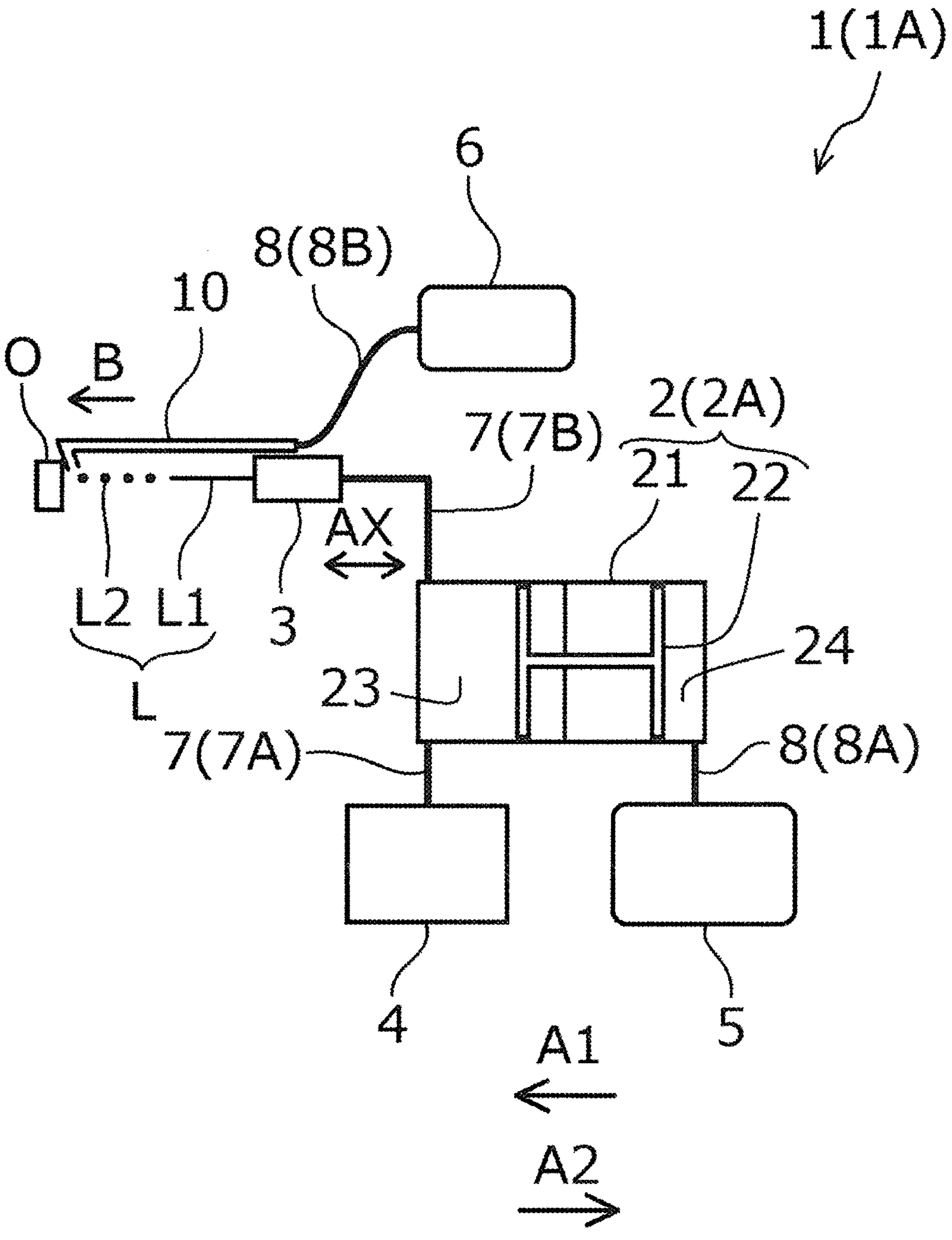
FIG. 1 is a schematic view showing a liquid jet device of a first example.

First, the present disclosure will be schematically described.

A liquid jet device according to a first aspect in this disclosure for solving the above problems includes a nozzle configured to jet liquid from a nozzle aperture in a jet direction along a first axis; a liquid transport tube that transports the liquid to the nozzle; and a suction tube that has a suction port and that sucks the liquid jetted from the nozzle through the suction port, wherein the suction tube has an extended portion that extends along the first axis and a bent portion that is connected to the extended portion and that bends in a bending direction that intersects the first axis, the suction port is disposed on an opposite side of the bent portion from the side of the bent portion connected to the extended portion, and the suction port is located further to the jet direction side than is the nozzle aperture in a direction along the first axis.

According to this aspect, the suction tube has the extended portion that extends along the first axis, and the bent portion that is connected to the extended portion and that bends in the bending direction that intersects the first axis, and the suction port of the bent portion is located further to the jet direction side than is the nozzle aperture in a direction along the first axis. According to such a configuration, it is possible to continue to jet liquid in a state where the suction port is not directly facing the object. Therefore, when sucking liquid while jetting liquid to the object, it is possible to suppress the suction port from sticking to the object by sucking liquid.

A second aspect of the liquid jet device in this disclosure is an aspect according to the first aspect above, wherein the nozzle is configured to jet the liquid in a continuous flow and to dropletize the continuous flow to cause the liquid to impact on an object.

According to this aspect, the nozzle is configured to be capable of jetting liquid in continuous flow and dropletizing the continuous flow, then causing the liquid to impact on the object. In this way, by jetting continuous flow of liquid, turning the continuous flow into droplets, and then causing the droplets to impact on the object, the impact force of the liquid can be dramatically improved compared to a configuration in which the liquid is simply jetted in a continuous flow and the continuous flow is caused to impact on the object.

A third aspect of the liquid jet device in this disclosure is an aspect according to the second aspect above, wherein a distance from the nozzle aperture to the suction port along the first axis is longer than a dropletization distance from the nozzle aperture to a position where the continuous flow turns into droplets.

According to this aspect, the distance from the nozzle aperture to the suction port along the first axis is longer than the dropletization distance from the nozzle aperture to the position where the continuous flow turns into droplet. Therefore, even in a state where the bent portion is brought into contact with the object, the liquid can be caused to impact against the object in a droplet form rather than in a continuous flow from. In other words, it is possible to cause the liquid to impact against the object with a strong impact force while effectively sucking liquid around the object by the suction tube.

A fourth aspect of the liquid jet device in this disclosure is according to any one of the first to third aspects above, wherein an angle of an internal angle at which the bent portion bends with respect to the first axis is equal to or greater than 80° and is less than 180°.

According to this aspect, the internal angle of the bent portion with respect to the first axis is equal to or greater than 80° and is less than 180°. In such a configuration, for example, when liquid is jetted perpendicular (90°) to an object surface of the object against which the liquid is cause to impact, the suction port will not become 90° (directly face) to the object surface and the bending angle of the bent portion with respect to the object surface becomes up to −10°. If the bending angle of the bent portion with respect to the object surface becomes equal to or greater than −10° and less than 90°, it is possible to especially efficiently suck the liquid that is on the object surface, while suppressing that the suction port sticks to the object.

A fifth aspect of the liquid jet device in this disclosure is according to any one of the first to third aspects above, wherein a diameter of the nozzle aperture is equal to or greater than 10 μm and is equal to or less than 120 μm.

According to this aspect, the diameter of the nozzle aperture is equal to or greater than 10 μm and equal to or less than 120 μm. In such a configuration, it is possible to improve the impact force of the liquid jetted from the nozzle to the object.

A sixth aspect of the liquid jet device in this disclosure is according to any one of the first to third aspects above, further including a liquid pumping section that applies a transport force for transporting the liquid to the nozzle.

According to this aspect, the liquid pumping section that applies a transport force for transporting the liquid to the nozzle is provided. In such a configuration, it is possible to suitably transport the liquid to the nozzle, and it is possible to jet the liquid from the nozzle by a strong pressure due to the transport force being applied.

A seventh aspect of the liquid jet device in this disclosure is according to the sixth aspect above, wherein the liquid pumping section has a cylinder and a piston, and applies the transport force to the liquid stored in the cylinder by moving the piston with respect to the cylinder.

According to this aspect, the liquid pumping section has the cylinder and the piston, and the transport force is applied to the liquid stored in the cylinder by moving the piston with respect to the cylinder. By using the liquid pumping section with such a configuration, it is possible to suppress the pulsation of the liquid jetted from the nozzle.

First Example

Hereinafter, embodiments of the present disclosure will be described with reference to the accompanying drawings. First, an outline of a liquid jet device 1A in a first example, which is an example of the liquid jet device 1 of the present disclosure, will be described with reference to FIGS. 1 and 2. The liquid jet device 1A of this example is capable of jetting liquid L in a form of a continuous flow L1, turning the continuous flow L1 into a droplet L2, and causing the liquid L to impact on an object O in a form of the droplet L2. However, it is not limited to such a liquid jet device 1. For example, the liquid jet device 1 may be configured to be capable of causing the liquid L to impact on the object O in a form of the continuous flow L1, of jetting the liquid L in a form of the droplet L2 from the beginning and of causing the liquid L to impact on the object O in a form of the droplet L2, or the like.

Figure 2:
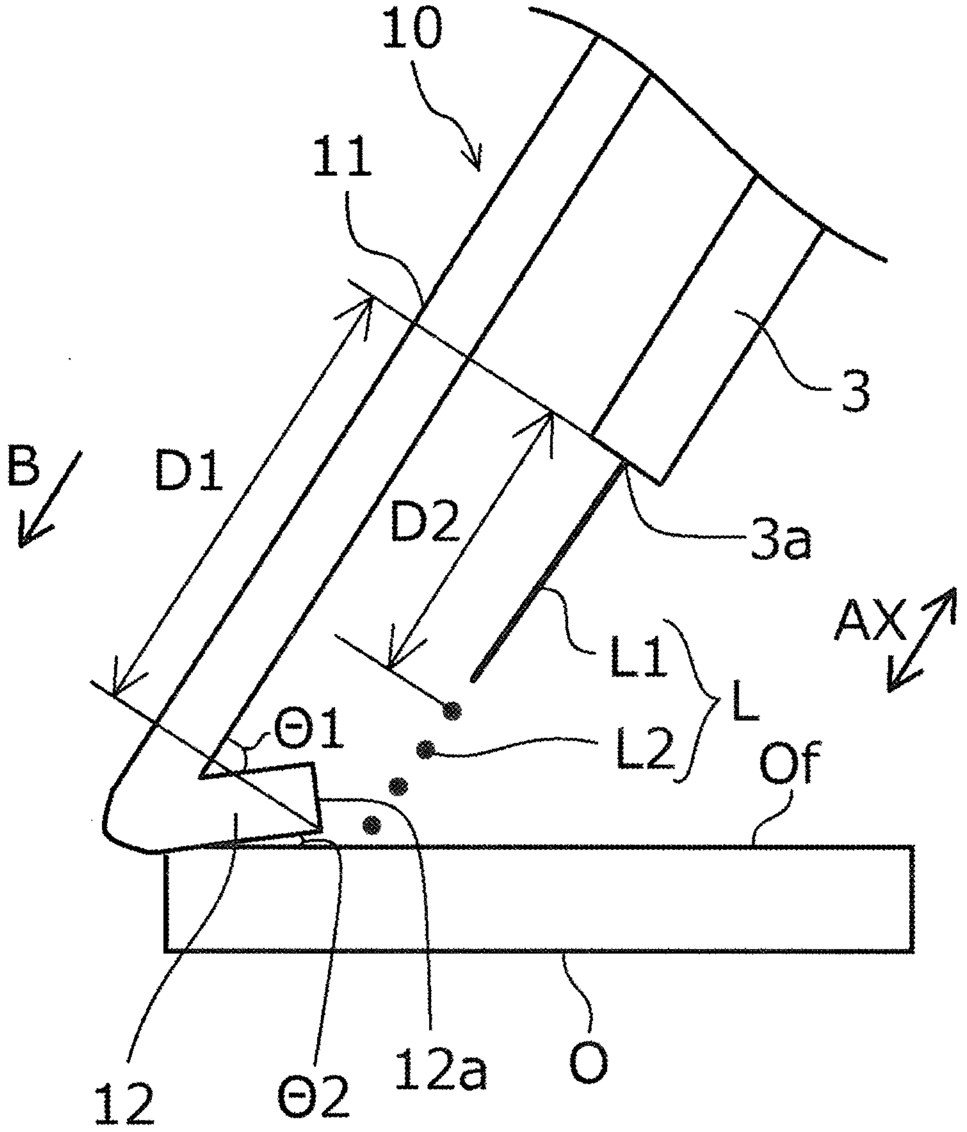
FIG. 2 is an enlarged view showing a nozzle and a suction tube of the liquid jet device in FIG. 1.

As shown in FIG. 1, the liquid jet device 1A in this example is equipped with a nozzle 3 that jets the liquid L from a nozzle aperture 3*a* shown in FIG. 2 in a jet direction B that is along a first axis AX. The liquid jet device 1A in this example is equipped with a liquid transport tube 7B that is a liquid transport tube 7 and that transports the liquid L to the nozzle 3. The liquid jet device 1A in this example is equipped with a suction tube 10 that has a suction port 12*a* as shown in FIG. 2 and that sucks the liquid L jetted from the nozzle 3 through the suction port 12*a*.

The liquid jet device 1A in this example is equipped with a pump 2 (pump 2A) that has a cylinder 21, in which a liquid chamber 23 and an air chamber 24 are provided, and a piston 22 that is movable in a direction A1 and a direction A2 inside the cylinder 21. The liquid jet device 1A in this example is equipped with a liquid storage section 4 that stores the liquid L and a compressed air tank 5 that stores compressed air. Here, the liquid storage section 4 is connected to a liquid transport tube 7A that is a liquid transport tube 7 and transports the liquid L to the liquid chamber 23. The compressed air tank 5 is connected to a pneumatic transport tube 8A that is a pneumatic transport tube 8 and transports air to the air chamber 24. The liquid jet device 1A in this example is configured to be capable of transporting the liquid L, which has already been transported from the liquid storage section 4 to the liquid chamber 23, to the nozzle 3 by moving the piston 22 in the direction A1 by transporting the compressed air from the compressed air tank 5 to the air chamber 24.

The liquid jet device 1A in this example is equipped with a suction pump 6 that connects to a pneumatic transport tube 8B that is the pneumatic transport tube 8 and that transports air sucked through the suction tube 10. The suction pump 6 is configured to be capable of sucking the liquid L that was sucked together with air by the suction tube 10.

Details of the suction tube 10 will be described below with reference to FIGS. 2 to 7. In the liquid jet device 1A in this example, as shown in FIG. 2, the suction tube 10 has an extended portion 11 that extends along the first axis AX and a bent portion 12 that connects to the extended portion 11 and bents in a bending direction that intersects the first axis AX. Here, the bent portion 12 is provided with the suction port 12*a* on an opposite side to the side that connects to the extended portion 11, and is configured such that the suction port 12*a* is located further to the jet direction B side than is the nozzle aperture 3*a* in the direction along the first axis AX.

Since the liquid jet device 1A in this example has such a configuration, it is possible to continuously jet the liquid L from the nozzle 3 in a state where the suction port 12*a* is not directly facing the object surface Of of the object O. Therefore, when the liquid L is sucked by the suction tube 10 while the liquid L is being jetted from the nozzle 3 to the object O, the liquid jet device 1A in this example can suppress the suction port 12*a* from sticking to the object surface Of of the object O as the suction tube 10 sucks the liquid L.

Here, as shown in FIG. 2, the nozzle 3 of the liquid jet device 1A in this example is configured to be capable of jetting the liquid L in the form of the continuous flow L1, turning the continuous flow L1 into the form of the droplet L2, then causing the liquid L to impact on the object O. In this way, by jetting the liquid L in the form of the continuous flow L1, turning the continuous flow L1 into the form of the droplet L2, and then causing the droplet L2 to impact on the object O, impact force of the liquid L can be significantly improved compared to a configuration in which the liquid L is simply jetted in a form of the continuous flow L1 and caused to impact on the object O in the form of the continuous flow L1 or a configuration in which the liquid L is jetted in the form of the droplet L2 from the beginning and caused the liquid L to impact on the object O in the form of the droplet L2.

As shown in FIG. 2, in the liquid jet device 1A in this example, a distance D1 from the nozzle aperture 3*a* to the suction port 12*a* along the first axis AX A is configured to be longer than a dropletization distance D2 from the nozzle aperture 3*a* to a position where the continuous flow L1 turns into the droplet L2. Therefore, for example, as shown in FIG. 2, even in a state where the bent portion 12 is brought into contact with the object O, the liquid L can be caused to impact against the object O in the form of the droplet L2, not in the form of the continuous flow L1. In other words, it is possible to cause the liquid L to impact on the object O with strong impact force while effectively sucking the liquid L around the object O by the suction tube 10.

"The distance D1 from the nozzle aperture 3*a* to the suction port 12*a* along the first axis AX" means, as shown in FIG. 2, a distance from the nozzle aperture 3*a* to a portion of the suction port 12*a* that is furthest from the nozzle aperture 3*a* along the first axis AX. The dropletization distance D2 can be changed by a diameter of the nozzle aperture 3*a*, a flow amount of the liquid L, and jet pressure, but is preferable to set to be equal to or less than 150 mm.

Here, in a configuration of the liquid jet device 1A in this example, the following are examples of actual measurement results of the dropletization distance D2 when the diameter of the nozzle aperture 3*a*, the flow amount of the liquid L, and the jet pressure are changed. The following are all actual measurement examples when there is only one nozzle aperture 3*a* in the nozzle 3. However, this disclosure is not limited to a configuration with a single nozzle aperture 3*a* is provided in the nozzle 3. A plurality of nozzle apertures 3*a* may be provided in the nozzle 3.

First, Table 1 below shows an example of actual measurement of the dropletization distance D2 due to changes in the flow amount and the jet pressure of the liquid L, where the nozzle aperture 3*a* has a diameter of 120 μm.

TABLE 1

| flow amount (ml/min) | jet pressure (Mpa) | D2 (mm) |
|---|---|---|
| 10 | 0.4 | 39 |
| 20 | 1.3 | 80 |
| 30 | 2.6 | 115 |
| 40 | 4.2 | 132 |
| 50 | 6.3 | 150 |
| 70 | 11.4 | 139 |

Next, Table 2 below is an example of actual measurement of the dropletization distance D2 due to changes in the flow amount and the jet pressure of the liquid L, where the nozzle aperture 3*a* has a diameter of 80 μm.

TABLE 2

| flow amount (ml/min) | jet pressure (Mpa) | D2 (mm) |
|---|---|---|
| 10 | 1.4 | 44 |
| 15 | 3.2 | 65 |
| 20 | 5.6 | 81 |
| 25 | 8.5 | 96 |

Next, Table 3 below is an example of actual measurement of the dropletization distance D2 due to changes in the flow amount and the jet pressure of the liquid L, where the nozzle aperture 3*a* has a diameter of 50 μm.

TABLE 3

| flow amount (ml/min) | jet pressure (Mpa) | D2 (mm) |
|---|---|---|
| 4 | 1.8 | 23 |
| 5 | 2.87 | 29 |
| 6 | 3.8 | 33 |
| 7 | 5.2 | 38 |
| 8 | 6.6 | 44 |
| 9 | 8.3 | 50 |

Next, Table 4 below is an example of actual measurement of the dropletization distance D2 due to changes in the flow amount and the jet pressure of the liquid L, where the nozzle aperture 3*a* has a diameter of 30 μm.

TABLE 4

| flow amount (ml/min) | jet pressure (Mpa) | D2 (mm) |
|---|---|---|
| 2.0 | 4.0 | 23 |
| 2.5 | 2.7 | 20 |
| 3.0 | 3.8 | 23 |
| 3.5 | 5.2 | 26 |
| 4.0 | 6.6 | 30 |
| 4.5 | 8.3 | 33 |

Next, Table 5 below is an example of actual measurement of the dropletization distance D2 due to changes in the flow amount and the jet pressure of the liquid L, where the nozzle aperture 3*a* has a diameter of 23 μm.

TABLE 5

| flow amount (ml/min) | jet pressure (Mpa) | D2 (mm) |
|---|---|---|
| 1.4 | 1.9 | 7.0 |
| 4.5 | 2.1 | 7.9 |
| 1.6 | 2.9 | 10.2 |
| 1.8 | 4.1 | 12.8 |
| 2.0 | 5.0 | 17.0 |
| 2.6 | 7.5 | 21.0 |
| 3.2 | 10.0 | 23.0 |

Next, Table 6 below is an actual measurement example of the dropletization distance D2 due to changes in the flow amount and the jet pressure of the liquid L, where the nozzle aperture 3*a* has a diameter of 10 μm.

TABLE 6

| flow amount (ml/min) | jet pressure (Mpa) | D2 (mm) |
|---|---|---|
| 0.2 | 2.0 | 0.0 |
| 0.3 | 4.0 | 0.2 |
| 0.4 | 7.0 | 1.7 |

As shown in Tables 1 to 6, the dropletization distance D2 can be changed depending on the diameter of the nozzle aperture 3*a*, the flow amount of the liquid L, and the jet pressure.

Here, the angle Θ1 of the internal angle of the bent portion 12, which bends with respect to the first axis AX, is preferably equal to or greater than 80° and less than 180°. In such a configuration, for example, when the liquid L is jetted perpendicularly (90°) to the object surface Of of the object O on which the liquid L is caused to impact, that is, when the nozzle 3 and the suction tube 10 are arranged so that the first axis AX is perpendicular (90°) to the object surface Of, the suction port 12*a* will not be 90° (directly face) to the object surface Of and a bending angle Θ2 of the bent portion 12 to the object surface Of will be up to −10°. When the bending angle Θ2 of the bent portion 12 with respect to the object surface Of is −10° or more and less than 90°, the liquid L on the object surface Of can be sucked particularly efficiently while suppressing the suction port 12*a* from sticking to the object O.

Note that for example, as shown in FIG. 2, the liquid jet device 1A in this example can also have the nozzle 3 and suction tube 10 arranged so that the first axis AX is oblique to the object surface Of, and can jet the liquid L obliquely to the object surface Of. Depending on the shape and arrangement of the object O, it may be easier for the user to perform work if the liquid L is jetted obliquely with respect to the object surface Of. Since the liquid jet device 1A in this example has a configuration described above, it is possible to suitably suck the liquid L jetted to the object O while obliquely jetting the liquid L with respect to the object surface Of.

However, even in the case where the liquid L is jetted obliquely to the object surface Of, the bending angle Θ2 of the bent portion 12 with respect to the object surface Of is preferably −10° or more and less than 90°. This is because the liquid L jetted to the object O can be particularly suitably sucked while jetting the liquid L obliquely with respect to the object surface Of. Note that if the bending angle Θ2 of the bent portion 12 with respect to the object surface Of is 90°, it corresponds to the bent portion 12 not being bent with respect to the extended portion 11.

Figure 3:
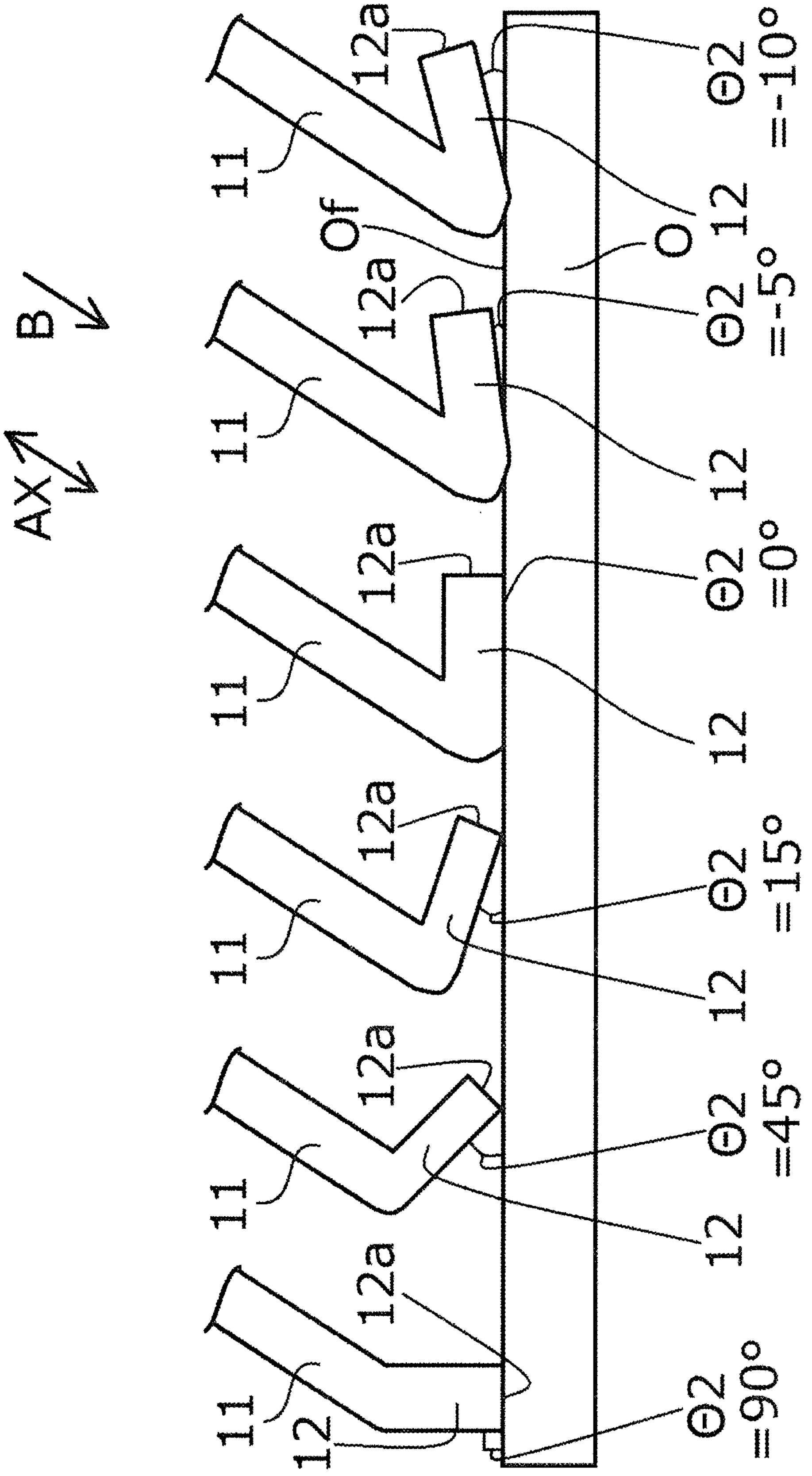
FIG. 3 is a schematic view showing an arrangement example of the suction tube with respect to an object.
Figure 4:
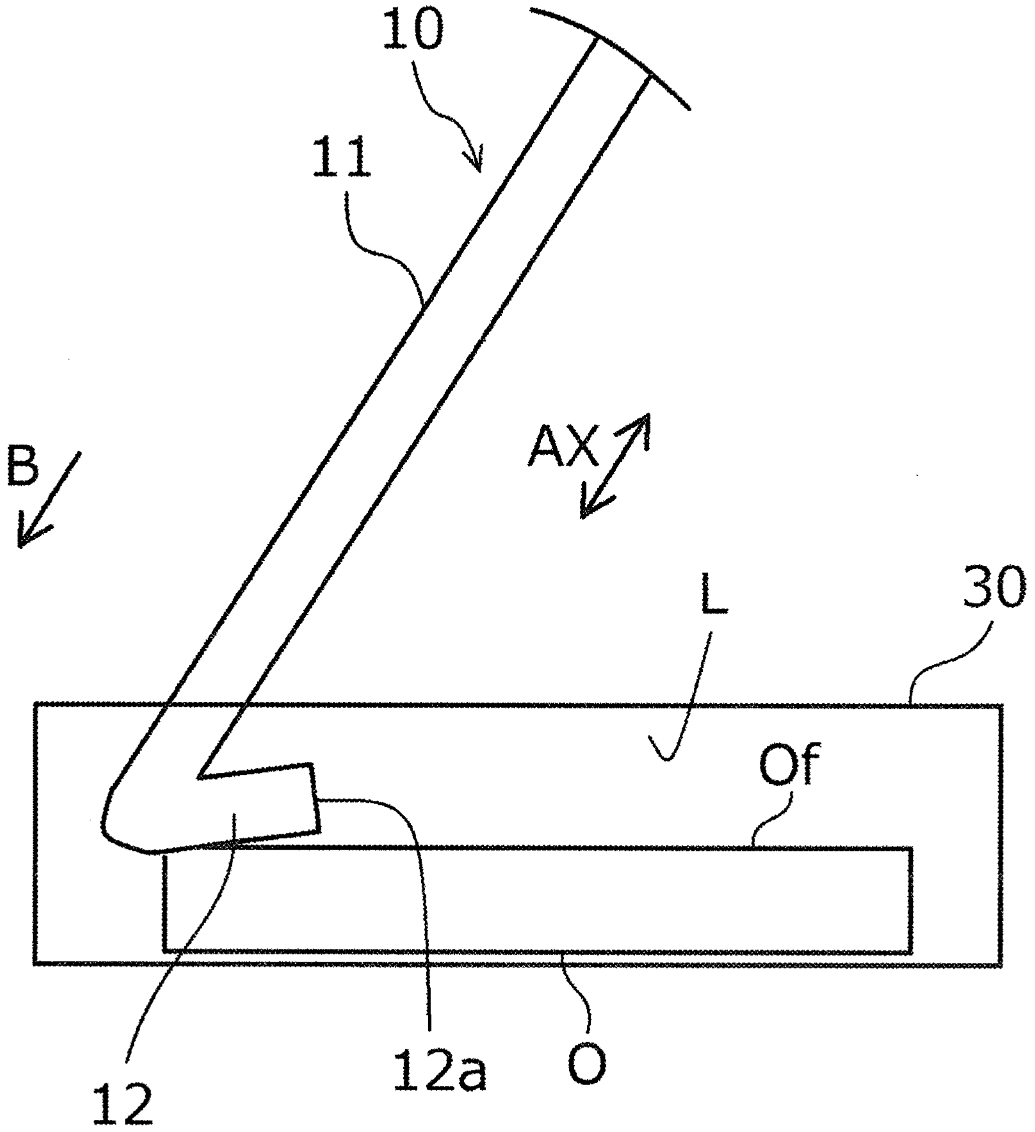
FIG. 4 is a view for explaining a method of measuring suction efficiency of liquid.

FIG. 3 shows the cases where the bending angle Θ2 of the bent portion 12 with respect to the object surface Of is 90°, 45°, 15°, 0°, −5° and −10°. Experimental results of suction efficiency using the suction tube 10 with these bending angles Θ2 are then shown below. As shown in FIG. 4, the experiment was performed by placing the object O in a petri dish 30 and filling the petri dish 30 with liquid L. Then, the suction pressure was set to 2 kPa, 10 kPa, and 20 kPa, and the suction was performed with suction tubes 10 at bending angles Θ2 of 90°, 45°, 15°, 0°, −5, and −10°. The experiment was performed to check how many times the bent portion 12 sticks to the object surface Of (FIG. 5) and how many seconds it takes for the liquid above the object surface Of to be sucked (FIG. 6) when suction was performed.

Figure 5:
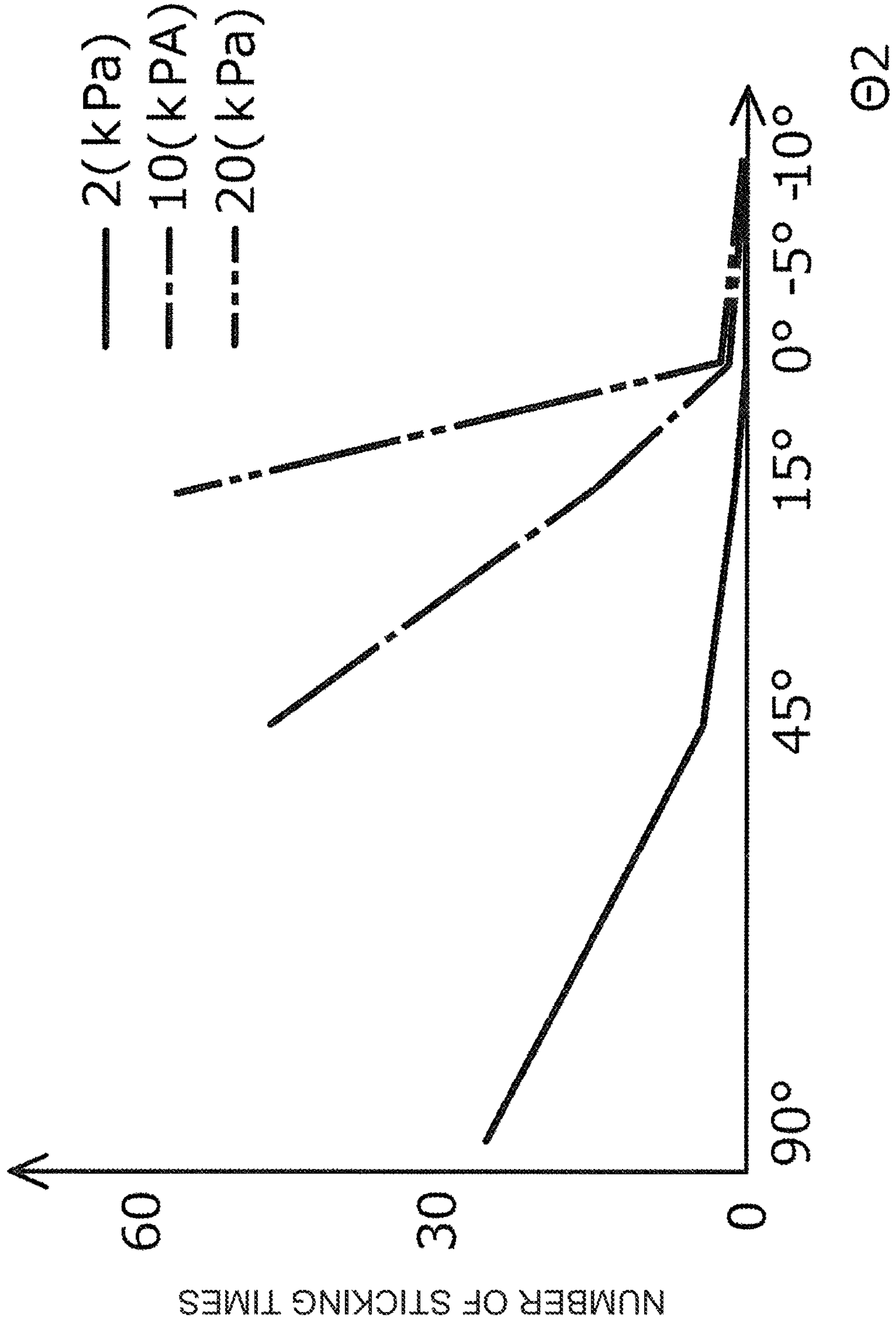
FIG. 5 is a graph showing a relationship between an angle formed between a bent portion and the object and number of sticking times.
Figure 6:
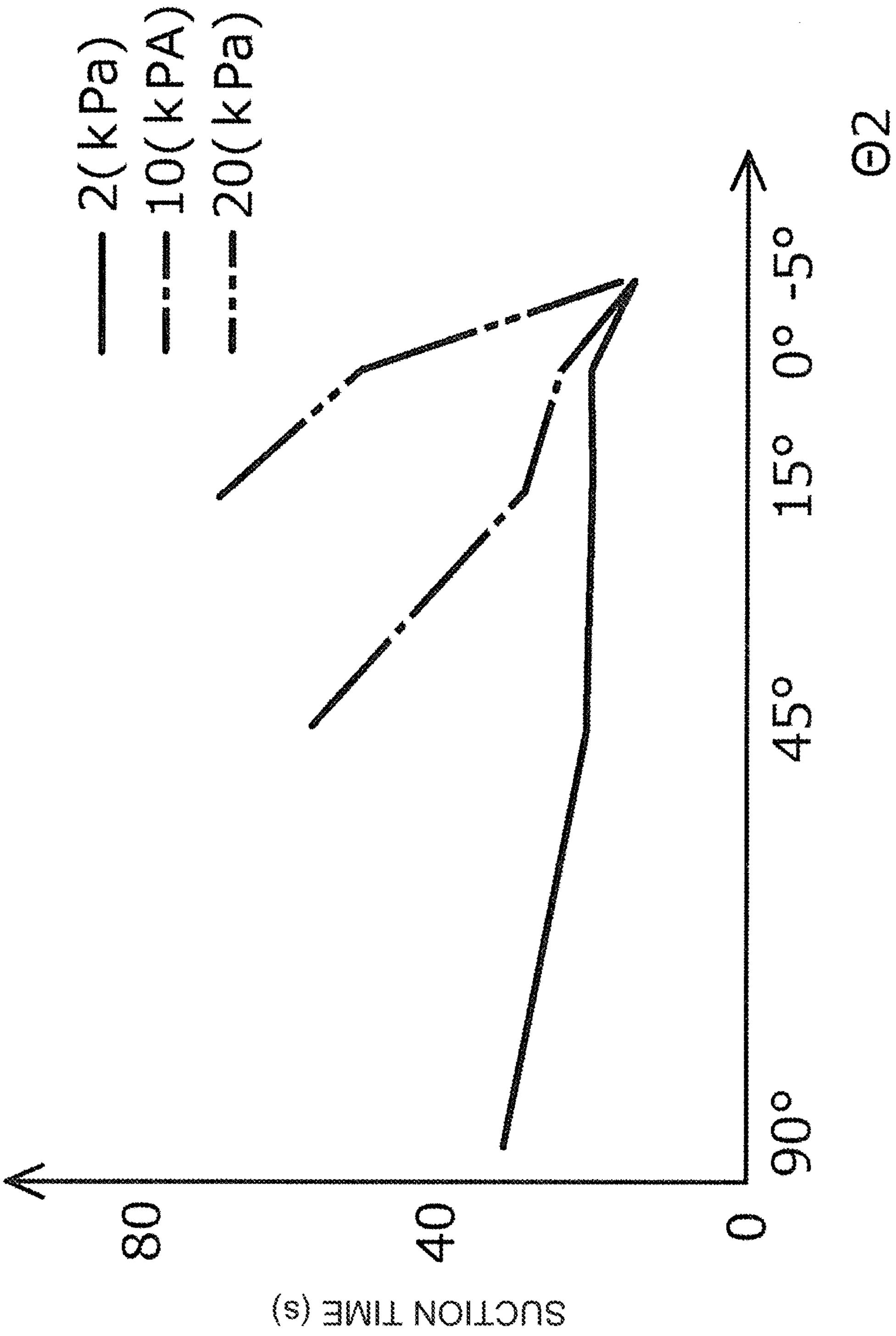
FIG. 6 is a graph showing a relationship between the angle formed between the bent portion and the object and the suction time.

As shown in FIG. 5, it can be seen that as the bending angle Θ2 changes to 90°, 45°, 15°, 0°, −5° and −10°, the number of sticking times decreases and suction can be performed more efficiently. As shown in FIG. 6, it can be seen that as the bending angle Θ2 changes to 90°, 45°, 15°, 0° and −5°, suction time becomes shorter and suction can be performed more efficiently. Note that in this experiment, since a less flexible object O was used, when the bending angle Θ2 was set to −10°, not all of the liquid above the object surface Of could be sucked up. However, when a highly flexible object O was used, the result when the bending angle Θ2 was set to −10° was equivalent to those when the bending angle Θ2 was set to −5°.

Note that the diameter of the nozzle aperture 3*a* is preferably equal to or greater than 10 μm and equal to or less than 120 μm. In such a configuration, it is possible to improve the impact force of the liquid L jetted from the nozzle 3 to the object O. Further, it is particularly preferable that the diameter of the nozzle aperture 3*a* be equal to or greater than 10 μm and equal to or less than 120 μm, the flow amount of the liquid L be equal to or greater than 0.2 mL/min and equal to or less than 70 mL/min, the diameter of the suction port 12*a* be equal to or greater than 0.5 mm and equal to or less than 5.0 mm, the suction pressure be equal to or greater than 2 kPa and equal to or less than 20 kPa, and the bending angle Θ2 be equal to or greater than −10° and less than 90°.

Second Example

Figure 7:
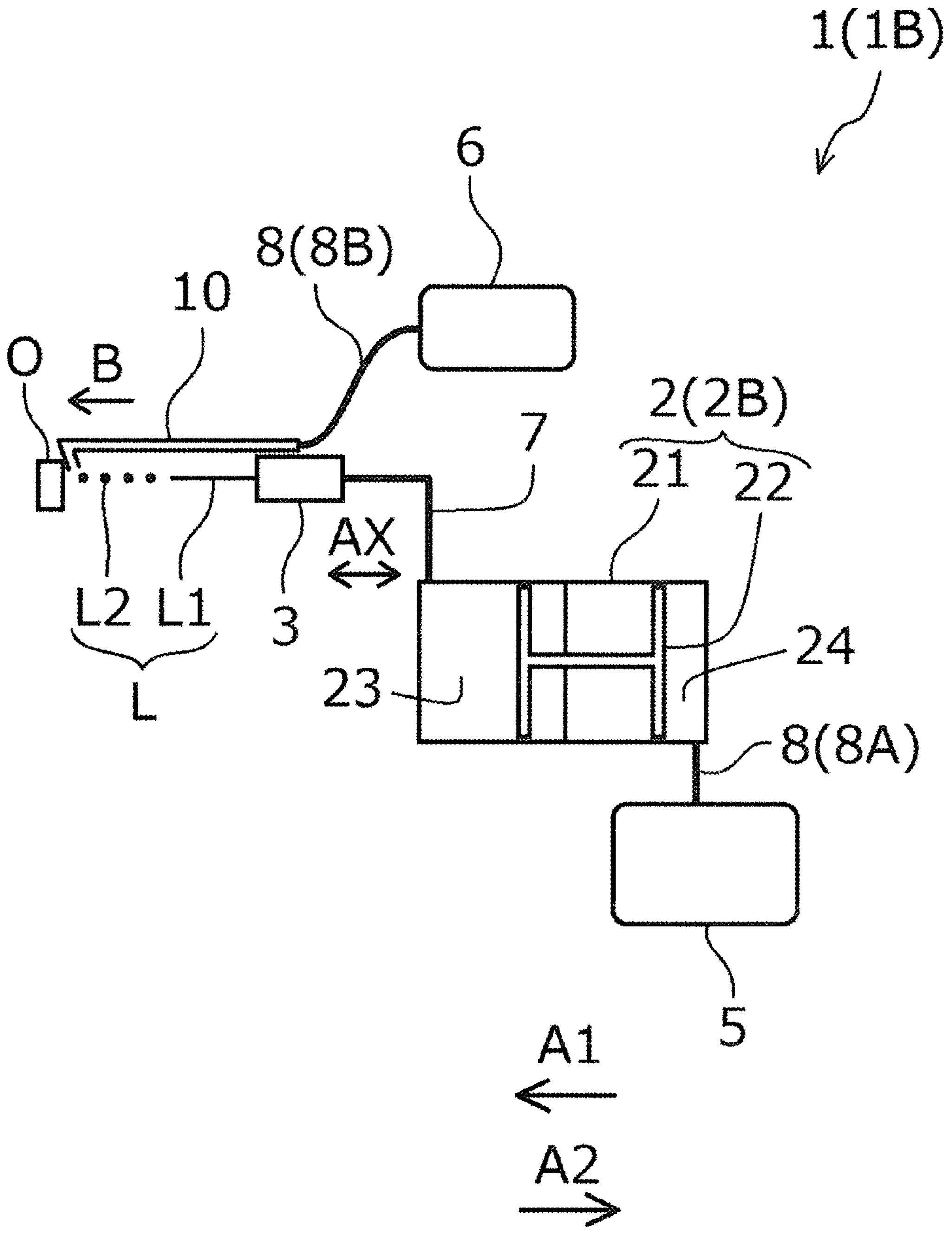
FIG. 7 is a schematic view showing a liquid jet device of a second example.

Hereinafter, a liquid jet device 1B in a second example will be described with reference to FIG. 7. FIG. 7 is a view corresponding to FIG. 1 in the liquid jet device 1A of the first example. The liquid jet device 1B in this example is the same as the liquid jet device 1A in the first example except for the configuration described below. Therefore, the liquid jet device 1B in this example has the same features as those of the liquid jet device 1A in the first example except for the following explanation sections. In FIG. 7, components that are common to those in the first example above are shown with the same symbols, and detailed explanations thereof are omitted.

As shown in FIG. 7, in the liquid jet device 1B in this example, a configuration of the pump 2 (pump 2B) is different from the configuration of the pump 2A of the liquid jet device 1A in the first example, and the liquid storage section 4 connected to the liquid chamber 23 as provided in the liquid jet device 1A in the first example is not provided. Instead, in the liquid jet device 1B in this example, a liquid inlet (not shown) is provided, the liquid chamber 23 is configured to be larger than that of the liquid jet device 1A in the first example, and the amount of the liquid L stored in the liquid chamber 23 in advance is increased. Since the liquid jet device 1B in this example has such a configuration, the device configuration can be simplified compared to the liquid jet device 1A in the first example.

Third Example

Figure 8:
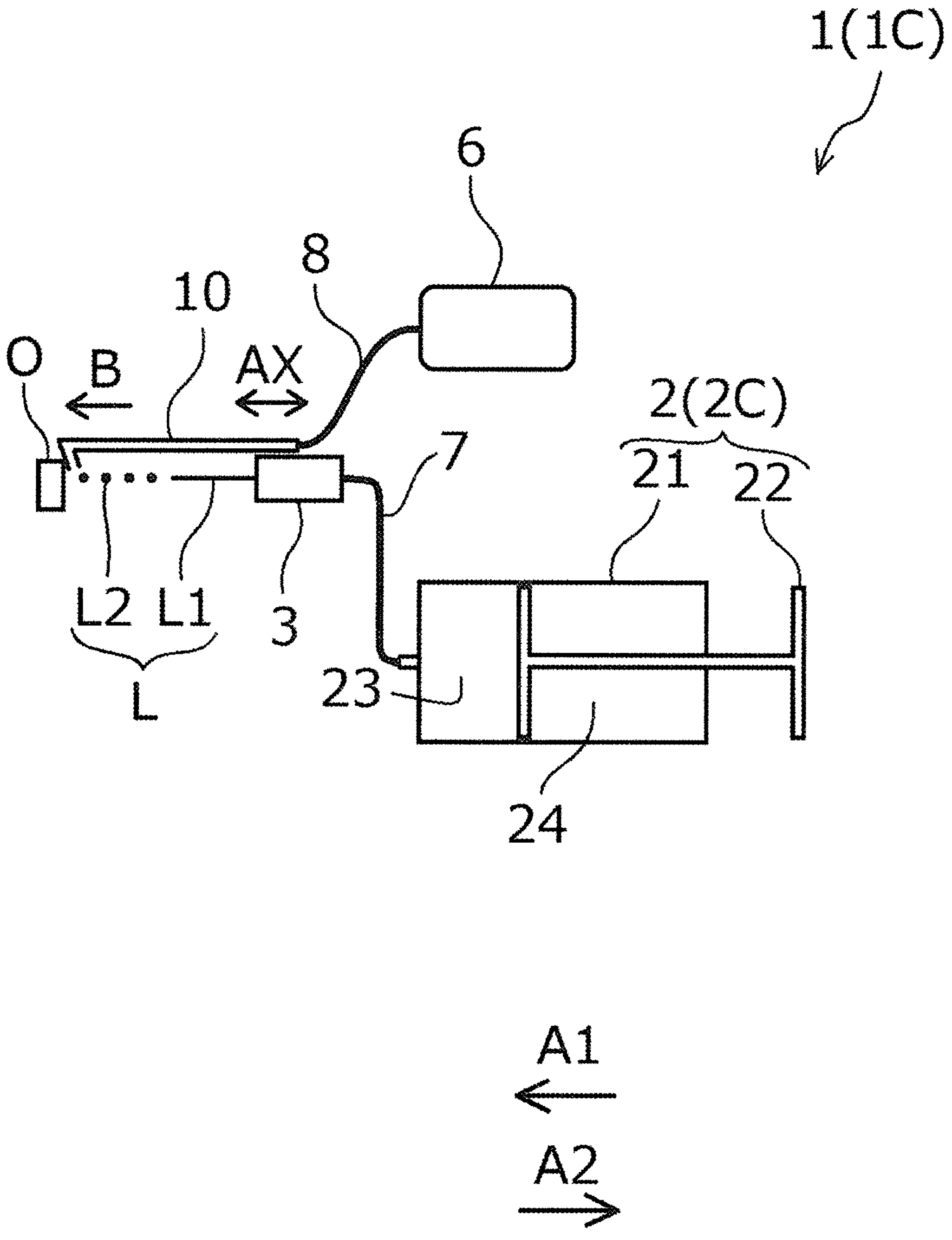
FIG. 8 is a schematic view showing a liquid jet device of a third example.

Hereinafter, a liquid jet device 1C in a third example will be described with reference to FIG. 8. FIG. 8 is a view corresponding to the liquid jet device 1A in the first example in FIG. 1. The liquid jet device 1C in this example is the same as the liquid jet device 1 in the first example and the second example except for the configuration described below. Therefore, the liquid jet device 1C in this example has the same features as those of the liquid jet device 1 in the first example and the second example except for the following explanation sections. In FIG. 8, components that are common to those in the first example and second example above are shown with the same symbols, and detailed explanations thereof are omitted.

As shown in FIG. 8, in the liquid jet device 1C in this example, a configuration of the pump 2 (pump 2C) is different from a configuration of the pump 2A of the liquid jet device 1A in the first example and the pump 2B of the liquid jet device 1B in the second example. Further, it is not provided with a liquid storage section 4 connected to the liquid chamber 23 as in the liquid jet device 1A in the first example, nor is provided with the compressed air tank 5 connected to the air chamber 24 as in the liquid jet device 1A in the first example and the liquid jet device 1B in the second example. Instead, in this example, the liquid jet device 1C has a pump 2C with a piston 22 that the user can manually move with respect to the cylinder 21 in the direction A1 and the direction A2. With such a configuration, it is possible to simplify the device configuration of the liquid jet device 1C in this example compared to the liquid jet device 1A in the first example and the liquid jet device 1B in the second example.

As described above, the liquid jet device 1 in the first example to the third example is provided with the pump 2 as a liquid pumping section that applies a transport force for transporting the liquid L to the nozzle 3. With such a configuration, it is possible to suitably transport the liquid L to the nozzle 3, and it is possible to jet the liquid L from the nozzle 3 with a strong pressure by the transport force being applied.

The pump 2 of the liquid jet device 1 in the first example to the third example has the cylinder 21 and the piston 22, and is configured to apply a transport force to the liquid L stored in the cylinder 21 by moving the piston 22 with respect to the cylinder 21. By using the liquid pumping section having such a configuration, it is possible to suppress pulsation of the liquid L jetted from the nozzle 3.

The present disclosure is not limited to the examples above, and can be realized by various configurations without departing from the scope of this disclosure. The technical features in the examples corresponding to the technical features in each aspect described in the summary of the disclosure can be appropriately replaced or combined in order to solve a part or all of the problems described above or in order to achieve a part or all of the effects described above. If the technical features are not described as essential in this specification, the technical features can be appropriately deleted.

What is claimed is:

1. A liquid jet device comprising:

a nozzle configured to jet liquid from a nozzle aperture in a jet direction along a first axis;

a liquid transport tube that transports the liquid to the nozzle; and a suction tube that has a suction port and that sucks the liquid jetted from the nozzle through the suction port, wherein the suction tube has an extended portion that extends along the first axis and a bent portion that is connected to the extended portion and that bends in a bending direction that intersects the first axis, the suction port is disposed on an opposite side of the bent portion from the side of the bent portion connected to the extended portion, and the suction port is located further to a jet direction side than the nozzle aperture in a direction along the first axis.

2. The liquid jet device according to claim 1, wherein the nozzle is configured to jet the liquid in a continuous flow and to dropletize the continuous flow to cause droplets of the liquid to impact on an object.

3. The liquid jet device according to claim 2, wherein a distance from the nozzle aperture to the suction port along the first axis is longer than a distance from the nozzle aperture to a position where the continuous flow turns into the droplets.

4. The liquid jet device according to claim 1, wherein an angle at which the bent portion bends with respect to the first axis is equal to or greater than 80° and is less than 180°.

5. The liquid jet device according to claim 1, wherein a diameter of the nozzle aperture is equal to or greater than 10 μm and is equal to or less than 120 μm.

6. The liquid jet device according to claim 1, further comprising:

a pump that transports the liquid to the nozzle.

7. The liquid jet device according to claim 6, wherein the pump has a cylinder and a piston, and transports the liquid stored in the cylinder to the nozzle by moving the piston with respect to the cylinder.

* * * * *